(12) United States Patent
Zhang et al.

(10) Patent No.: US 11,782,138 B2
(45) Date of Patent: *Oct. 10, 2023

(54) LIDAR DETECTION SYSTEMS AND METHODS WITH HIGH REPETITION RATE TO OBSERVE FAR OBJECTS

(71) Applicant: Innovusion, Inc., Sunnyvale, CA (US)

(72) Inventors: Rui Zhang, Palo Alto, CA (US); Gang Zhou, San Jose, CA (US); Yimin Li, Cupertino, CA (US); Junwei Bao, Los Altos, CA (US)

(73) Assignee: Innovusion, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,644

(22) Filed: May 27, 2022

(65) Prior Publication Data

US 2022/0291343 A1 Sep. 15, 2022

Related U.S. Application Data

(63) Continuation of application No. 16/282,163, filed on Feb. 21, 2019, now Pat. No. 11,391,823.
(Continued)

(51) Int. Cl.
| | | |
|---|---|---|
| *G01S 7/48* | (2006.01) | |
| *G01S 7/484* | (2006.01) | |
| *G01S 17/10* | (2020.01) | |
| *G01S 17/04* | (2020.01) | |
| *G01S 17/931* | (2020.01) | |
| *G01S 17/89* | (2020.01) | |

(52) U.S. Cl.
CPC .............. *G01S 7/484* (2013.01); *G01S 17/04* (2020.01); *G01S 17/10* (2013.01); *G01S 17/89* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 3,897,150 A | * 7/1975 | Bridges | ............... G01S 17/10 |
| | | | 348/138 |
| 4,464,048 A | 8/1984 | Farlow | |
| | (Continued) | | |

FOREIGN PATENT DOCUMENTS

| | | |
|---|---|---|
| CN | 1677050 A | 10/2005 |
| CN | 204216401 U | 3/2015 |
| | (Continued) | |

OTHER PUBLICATIONS

Chen, X. et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
(Continued)

*Primary Examiner* — Hovhannes Baghdasaryan
(74) *Attorney, Agent, or Firm* — Mauriel Kapouytian Woods LLP; Liang Huang

(57) ABSTRACT

Embodiments discussed herein refer to LiDAR systems that accurately observe objects that are relatively close and objects that are relatively far using systems and methods that employ a variable time interval between successive laser pulses and one or more filters.

26 Claims, 10 Drawing Sheets

Related U.S. Application Data

(60) Provisional application No. 62/633,348, filed on Feb. 21, 2018.

(56) References Cited

U.S. PATENT DOCUMENTS

| | | |
|---|---|---|
| 4,676,586 A | 6/1987 | Jones et al. |
| 4,923,263 A | 5/1990 | Johnson |
| 5,006,721 A | 4/1991 | Cameron et al. |
| 5,157,451 A | 10/1992 | Taboada |
| 5,319,434 A | 6/1994 | Croteau et al. |
| 5,369,661 A | 11/1994 | Yamaguchi et al. |
| 5,442,358 A | 8/1995 | Keeler et al. |
| 5,504,731 A | 4/1996 | Lee et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,289,282 B1 * | 9/2001 | Hassler .............. G01S 13/931 701/96 |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di et al. |
| 7,489,865 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,559,107 B2 | 10/2013 | Chann et al. |
| 8,736,818 B2 | 5/2014 | Weimer et al. |
| 8,743,455 B2 | 6/2014 | Gusev et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,465,175 B2 | 10/2016 | Shi et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,879,990 B2 | 1/2018 | Klepsvik et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 9,989,629 B1 | 6/2018 | LaChapelle |
| 10,003,168 B1 | 6/2018 | Villeneuve |
| 10,007,001 B1 | 6/2018 | LaChapelle et al. |
| 10,012,732 B2 | 7/2018 | Eichenholz et al. |
| 10,031,214 B2 | 7/2018 | Rosenzweig et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,852,398 B2 | 12/2020 | Yu et al. |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 2002/0136251 A1 | 9/2002 | Green et al. |
| 2002/0149757 A1 | 10/2002 | Kelsey et al. |
| 2004/0135992 A1 | 7/2004 | Munro |
| 2005/0033497 A1 | 2/2005 | Stopczynski |
| 2005/0088641 A1 | 4/2005 | Hung et al. |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0188735 A1 | 8/2007 | Braunecker et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0028193 A1 | 1/2009 | Islam |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Brochers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |

(56) References Cited

U.S. PATENT DOCUMENTS

| | | |
|---|---|---|
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2011/0235019 A1 | 9/2011 | Matsubara et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspeil |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0226140 A1 | 8/2014 | Chuang et al. |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0273034 A1 | 9/2016 | Lundquist et al. |
| 2016/0274237 A1* | 9/2016 | Stutz .................. G01S 17/36 |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0070029 A1 | 3/2017 | Moeneclaey et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0031678 A1 | 2/2018 | Singer et al. |
| 2018/0040171 A1 | 2/2018 | Kundu et al. |
| 2018/0050704 A1 | 2/2018 | Tascione et al. |
| 2018/0060700 A1* | 3/2018 | Bleyer ................ G06V 10/145 |
| 2018/0069367 A1 | 3/2018 | Villeneuve et al. |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwolfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0273365 A1 | 9/2019 | Zediker et al. |
| 2019/0277952 A1 | 9/2019 | Beuschel et al. |
| 2019/0310368 A1 | 10/2019 | LaChapelle |
| 2019/0339393 A1* | 11/2019 | Lingg .................... G06V 20/58 |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0341124 A1 | 10/2020 | Yu et al. |
| 2020/0400798 A1* | 12/2020 | Rezk ..................... G01S 7/4911 |
| 2021/0088630 A9* | 3/2021 | Zhang .................. G02B 26/123 |

FOREIGN PATENT DOCUMENTS

| | | |
|---|---|---|
| CN | 204758260 U | 11/2015 |
| CN | 204885804 U | 12/2015 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 1427164 A * | 3/1976 .......... G01S 13/225 |
| GB | 2000411 | 1/1979 |
| JP | 2003167281 A | 6/2003 |

(56) References Cited

FOREIGN PATENT DOCUMENTS

| | | | |
|---|---|---|---|
| JP | 2006322759 A | 11/2006 |
| JP | 2007144667 A | 6/2007 |
| JP | 2008107286 A | 5/2008 |
| JP | 2009156666 A | 7/2009 |
| JP | 2010035385 A | 2/2010 |
| JP | 2010045965 A | 2/2010 |
| JP | 2012026921 A | 2/2012 |
| JP | 2016206610 A | 12/2016 |
| JP | 2017-003347 A | 1/2017 |
| JP | 2017-138301 A | 8/2017 |
| JP | 109116367 B | 5/2020 |
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jul. 9, 2019, for International Application No. PCT/US2019/018987, 17 pages.

International Search Report and Written Opinion, dated Sep. 18, 2018, for International Application No. PCT/US2018/012116, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Jan. 3, 2019, for International Application No. PCT/US2018/056577, 15 pages.

International Search Report and Written Opinion, dated Mar. 23, 2018, for International Application No. PCT/US2018/012704, 12 pages.

International Search Report and Written Opinion, dated Jun. 7, 2018, for International Application No. PCT/US2018/024185, 9 pages.

International Preliminary Report on Patentability, dated Apr. 30, 2020, for International Application No. PCT/US2018/056577, 8 pages.

European Search Report, dated Jul. 17, 2020, for EP Application No. 18776977.3, 12 pages.

Extended European Search Report, dated Jul. 10, 2020, for EP Application No. 18736738.8, 9 pages.

Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.

Extended European Search Report, dated Jul. 22, 2020, for EP Application No. 18736685.1, 10 pages.

Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.

Office Action Issued in Japanese Patent Application No. 2019-536019 dated Nov. 30, 2021, 6 pages.

European Search Report, dated Jun. 17, 2021, for EP Application No. 18868896.4, 7 pages.

"Fiber laser," Wikipedia, https://en.wikipedia.org/wiki/Fiber_laser, 6 pages.

International Search Report and Written Opinion, dated Mar. 19, 2018, for International Application No. PCT/US2018/012705, 12 pages.

International Search Report and Written Opinion, dated Mar. 20, 2018, for International Application No. PCT/US2018/012703, 13 pages.

"Mirrors", Physics LibreTexts, https://phys.libretexts.org/Bookshelves/Optics/Supplemental_Modules_(Components)/Mirrors, (2021), 2 pages.

"Why Wavelengths Matter in Fiber Optics", FirstLight, https://www.firstlight.net/why-wavelengths-matter-in-fiber-optics/, (2021), 5 pages.

Johnson, L., "Parabolic Mirror: How It Works & Types (w/ Examples)", https://sciencing.com/parabolic-mirror-how-it-works-types-w-examples-diagram-13722364.html, Updated Dec. 28, 2020, 14 pages.

Helser, G., "Laser damage threshold—Galvo Mirror vs Polygon mirror", https://precisionlaserscanning.com/2016/03/laser-damage-threshold-galvo-mirror-vs-polygon-mirror/, Mar. 25, 2016, 4 pages.

International Search Report and Written Opinion, dated Jun. 12, 2019, for International Application No. PCT/US2019/019030, 13 pages.

* cited by examiner $R_1$ Object Distances $$OD_{1(R_1)} = (t_{R_1} - t_{T_2}) * \frac{C}{2}$$

$$OD_{2(R_1)} = (t_{R_1} - t_{T_1}) * \frac{C}{2}$$

---

$R_2$ Object Distances $$OD_{1(R_2)} = (t_{R_2} - t_{T_3}) * \frac{C}{2}$$

$$OD_{2(R_2)} = (t_{R_2} - t_{T_2}) * \frac{C}{2}$$

FIG. 6

$OD_1$ Filter $$\text{If } |OD_{1(R_2)} - OD_{1(R_1)}| < \text{Threshold} \longrightarrow \text{Pass/Positive}$$

$$\text{Else} \longrightarrow \text{Fail/Negative}$$

$OD_2$ Filter $$\text{If } |OD_{2(R_2)} - OD_{2(R_1)}| < \text{Threshold} \longrightarrow \text{Pass/Positive}$$

$$\text{Else} \longrightarrow \text{Fail/Negative}$$

FIG. 7A $$\text{If } |NOD_{2(P_1)} - NOD_{2(P_0)}| < \text{Threshold} \longrightarrow \text{Pass/Positive}$$

$$\text{Else} \longrightarrow \text{Fail/Negative}$$

FIG. 7B

LIDAR DETECTION SYSTEMS AND METHODS WITH HIGH REPETITION RATE TO OBSERVE FAR OBJECTS

CROSS-REFERENCE TO A RELATED APPLICATION

This application is a continuation of U.S. application Ser. No. 16/282,163, entitled "LIDAR DETECTION SYSTEMS AND METHODS WITH HIGH REPETITION RATE TO OBSERVE FAR OBJECTS", filed Feb. 21, 2019, which claims the benefit of U.S. Provisional Application No. 62/633,348, entitled "LIDAR DETECTION SYSTEMS AND METHODS WITH HIGH REPETITION RATE TO OBSERVE FAR OBJECTS", filed Feb. 21, 2018. The contents of both applications are incorporated herein by reference in their entireties for all purposes.

FIELD OF THE INVENTION

The present disclosure relates to light detection and ranging (LiDAR), and in particular to LiDAR systems and methods for use in a vehicle.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. Conventional LiDAR systems designed to observe objects 200 meters or more away use a relatively slow repetition rate. The relatively slow repetition rate results in a relatively low resolution, but does not result in too many false positives. However, in order to improve the resolution, conventional LiDAR systems may increase its repetition rate. The increase in repetition rate, however, results in false alarms. This is because an object that is relatively far away is registered as an object that is relatively close. This is so called "range ambiguity". Such erroneous false positives may adversely affect the operation of a vehicle using this conventional LiDAR system.

It is desirable for LiDAR systems to accurately observe objects, including objects that are close and objects that are far.

BRIEF SUMMARY

Embodiments discussed herein refer to LiDAR systems that accurately observe objects that are relatively close and objects that are relatively far using systems and methods that employ a variable high frequency repetition rate and a filter or multiple filters.

In one embodiment, a light detection and ranging (LiDAR) system is provided. The LiDAR system can include a transmission system, which can include a laser, time interval adjustment circuitry operative to generate a variable time intervals, and transmission control circuitry coupled to the laser and the time interval adjustment circuitry, wherein the control circuitry is operative to cause the laser to emit transmission pulses in accordance with the variable time intervals. The system can include a receiver system having a receiver operative to detect return pulses that are consequences of the transmission pulses, and receiver control circuitry coupled to receive an output of the receiver and the variable time interval. The receiver control circuitry can be operative to: for each detected return pulse, calculate a plurality of object distances based on a plurality of successive transmission pulses; compare at least two calculated object distances corresponding to a currently detected return pulse to at least two calculated distance objects corresponding to a previously detected return pulse to filter out calculated distance objects that fail filter criteria; and provide object distances that pass the filter criteria as data points for constructing an image of objects observed by the LiDAR system.

In another embodiment, a method for using a LiDAR system to generate an image of observed objects is provided. The method includes transmitting successive transmission pulses in accordance with a variable time interval, wherein the variable time interval changes for each transmission pulse, receiving a plurality of return pulses, in response to each received return pulse, calculating a plurality of object distances based on a plurality of successive transmission pulses, comparing at least two calculated object distances corresponding to a currently detected return pulse to at least two calculated distance objects corresponding to a previously detected return pulse to filter out calculated distance objects that fail filter criteria, rejecting object distances that fail filter criteria, and providing object distances that pass filter criteria for use in generating the image.

In another embodiment, a LiDAR system is provided that includes a laser transmission system operative to transmit laser pulses in succession, wherein a time interval between successively transmitted laser pulses is varied, a receiver system to detect return pulses that are consequences of the transmitted laser pulses, and control circuitry operative to use the varied time interval of successively transmitted laser pulses to discriminate among distance calculations of an object corresponding to the return pulses.

In another embodiment, a method for using a LiDAR system is provided transmitting successive transmission pulses in accordance with a variable time interval, wherein the variable time interval changes for each transmission pulse; receiving a plurality of return pulses corresponding to an object; determining distance calculations corresponding to the object based on the plurality of return pulses and a plurality of successive transmission pulses; discriminating among the distance calculations by evaluating the plurality of return pulses in connection with the variable time interval of the successive transmission pulses; and providing the discriminated distances as data points for generating a image representing a field of view of the LiDAR system.

In yet another embodiment, a method for using a LiDAR system provided by discriminating among observed objects that are relatively close and observed objects that are relatively far by varying a time interval between successive laser pulses being emitted by the LiDAR system, and using results of the discriminating as data points for generating a image representing a field of view of the LiDAR system.

A further understanding of the nature and advantages of the embodiments discussed herein may be realized by reference to the remaining portions of the specification and the drawings.

BRIEF DESCRIPTION OF THE DRAWINGS

FIG. 6 shows object distances, according to an embodiment;

FIGS. 7A and 7B show illustrative applications of filtering criteria, according to various embodiments;

DETAILED DESCRIPTION

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
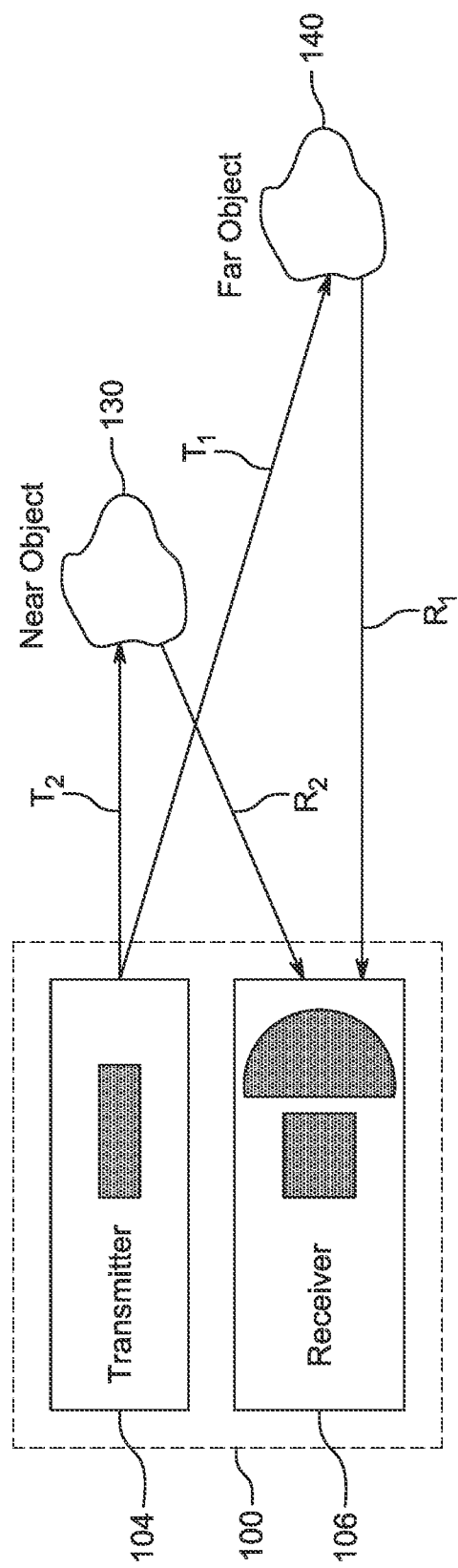
FIG. 1 shows an illustrative scenario in which a conventional LiDAR system can detect objects but is unable to distinguish distance difference between multiple objects.

FIG. 1 shows an illustrative scenario in which a conventional LiDAR system can detect objects but is unable to distinguish distance difference between multiple objects. In particular, FIG. 1 shows LiDAR system 100, which can include transmitter 104 and receiver 106, near object 130, and far object 140. Far object is farther away from system 100 than near object 130. During operation, transmitter 104 transmits signal T1 first, followed by signal T2. Each transmitted signal produces a receiver signal when the transmitted signal reflects back from an object. Receiver signal R1 is produced in response to transmit signal T1, and receiver signal R2 is produced in response to transmit signal T2. Receiver 106 may receive signal R2 before it receives signal R1, even though signal T1 was transmitted before signal T2. Receipt of signal R2 before R1 may cause system confusion of the correct correspondence of transmitted and received signals, thus calculate the distance incorrectly. In order to prevent confusion, the repetition rate of transmitter pulses (or signals) is slowed down, so that the time interval between T1 and T2 is large enough that R1 can return before the system sends T2. In practice this time interval is set to be the round trip time of light traveling in the maximum detection distance with optional additional margin. However, a relatively slow repetition rate results in a relatively low resolution. To increase the resolution, a high repetition rate system is required. Increasing the repetition rate, M, effectively limits how far system 100 can accurately observe objects. The distance of an observed object is equal to c/2/M, where c is the speed of light, and M is the repetition rate of the transmitter pulses.

Figure 2:
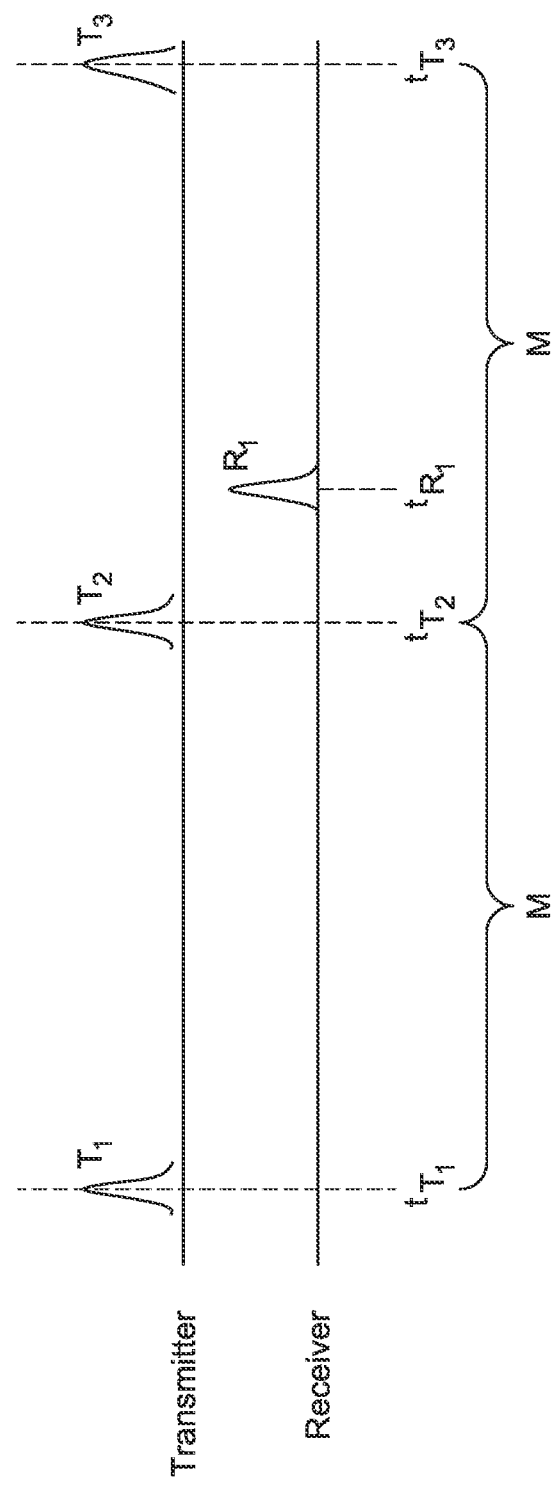
FIG. 2 shows an illustrative timing diagram.

FIG. 2 shows an illustrative timing diagram of a transmitter having transmitter signals T1 and T2, and of a receiver having receiver signal R1. As shown, transmitter signal T1 is transmitted at time, $t_{T1}$, and transmitter signal T2 is transmitted at time, $t_{T2}$, and receiver signal R1 is received at time, $t_{R1}$. A conventional LiDAR system has a fixed repetition rate, M. The time interval between each transmitter pulse is 1/M. For example, if the repetition rate is 1 MHz, then the time interval is 1 μs. Based on a distance equation of c/2/M, a 1 Mhz repetition results in a distance of 150 meters. If the object is located at a distance greater than 150 meters, such as 180 meters, the receiver signal R1 is received at time that exceeds the 1 μs time interval (i.e., 1.2 μs after time, tri, and 0.2 μs after time, tr. The system cannot distinguish whether R1 is the return pulse corresponding to T1 or T2. Conventional systems may typically consider that R1 is a return corresponding to T2 (e.g., because objects that are relatively far away typically have weak return signals). In considering that R1 corresponds to T2, the system may determine the object is (1.2-1.0 μs)*c/2 is 30 meters. In this regard, R1 is considered a ghost because an object that is actually far away is being considered as an object that is close. Registering the object at meters instead of 180 meters may result in undesired actions (e.g., an erroneous brake by an autonomous car system). As defined herein, a ghost object is associated with the incorrect distance calculation. Referring to the example above, R1 is actually at 180 meters, but the system also registers R1 at 30 meters. Embodiments discussed herein are able to reject the 30 meter distance calculation as a ghost image and use 180 meters as the correct distance calculation to be assigned to R1.

Embodiments discussed herein vary the time interval between each transmitter pulse. Time interval variation of successive pulses enables the LiDAR system and methods for the use thereof to accurately detect objects that are observed relatively far away, reject ghost, and avoid interference from other LiDAR systems.

Figure 3A:
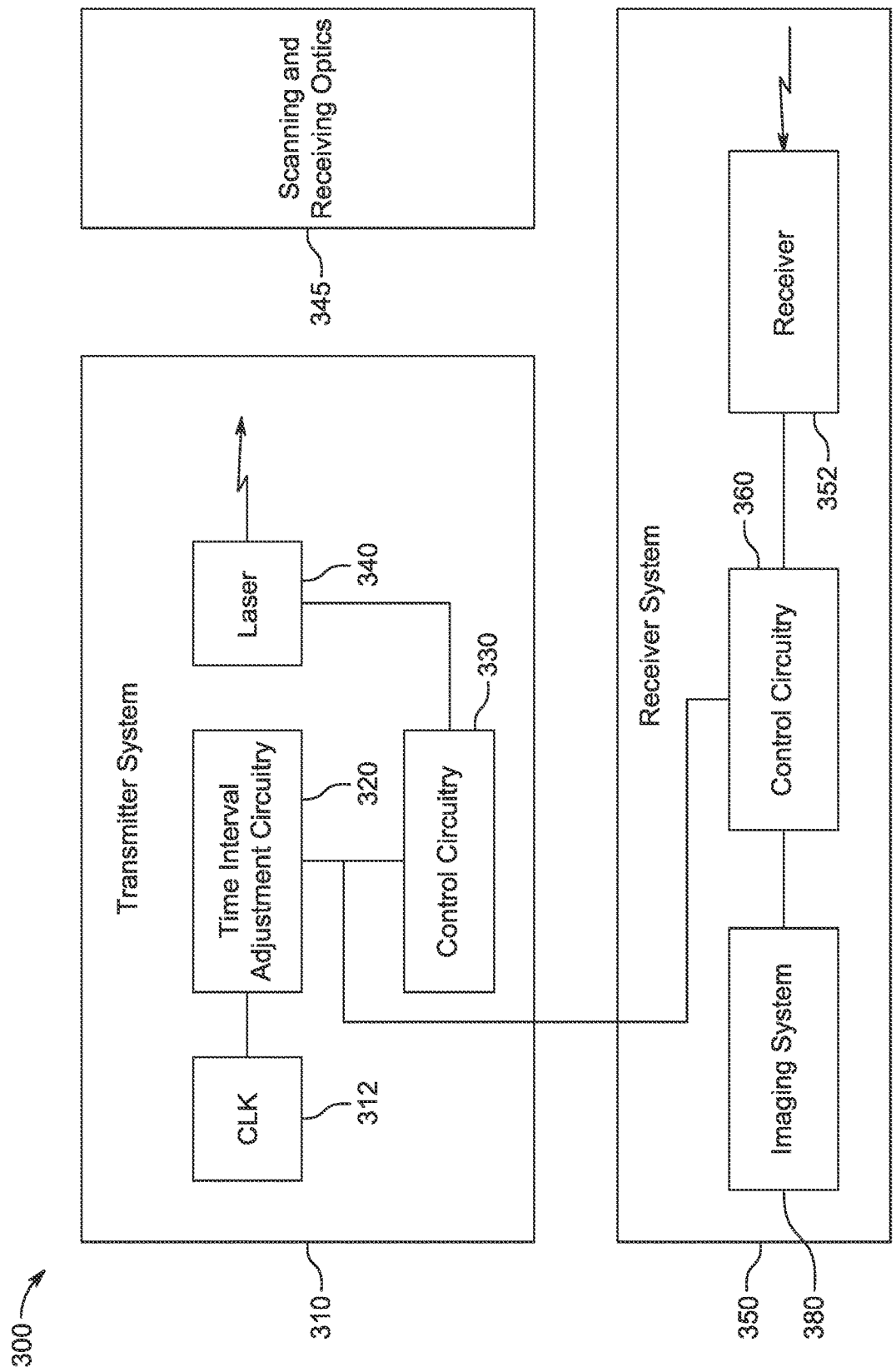
FIG. 3A shows an illustrative LiDAR system, according to an embodiment.

FIG. 3A shows an illustrative LiDAR system 300 according to an embodiment. System 300 can include transmitter system 310 and receiver system 350. Other components and systems may exist as part of the LiDAR system 300, but are not shown to avoid overcrowding the drawing. Transmitter system 310 can include clock 312, repetition rate/time interval adjustment circuitry 320, control circuitry 330, and laser 340. Clock 312 may be a system clock that serves as a reference for one or more components in system 300. Time interval adjustment circuitry 320 may be operative to control and/or adjust the repetition rate/time interval of the transmitter pulse of laser 340. Time interval adjustment circuitry 320 can vary the repetition rate/time interval for each transmitter pulse such that no two successive transmitter pulses have the same repetition rate/time interval. For example, assume that a first interval between a first transmitter pulse and a second transmitter pulse is M, then the immediately successive interval for a successive transmitter pulse is $(1\pm\alpha)$M, where α is a randomization factor that is applied to M. The randomization factor may be bounded to prevent the time interval from exceeding maximum and minimum bounds Control circuitry 330 may receive the repetition rate from repetition rate adjustment circuitry for each transmitter pulse and causes laser 340 transmit laser pulses in accordance with the current repetition rate. For example, for a first period, the time interval between successive pulses may be 1 us, then for a third successive pulse (which immediately follows the first two pulses), the time interval may be 1.1 us, and then for a fourth successive pulse, the time interval may be 0.97 us. The laser pulses being emitted by laser 340 may be directed through scanning and receiving optics 345, which may include a combination of lenses, mirrors, one or more rotating polygons and/or oscillation mirrors, and any other suitable components. See, for example, commonly assigned U.S. patent application Ser. No. 16/242,567, filed Jan. 8, 2019, for illustrative examples of scanning and receiving optics.

Receiver system 350 can include receiver 352, control circuitry 360, and imaging system 380. Receiver 352 may detect return pulses originating from transmission pulses that are reflected back from one or more objects. Reflected transmission pulses may be routed through a portion of scanning and receiving optics 345 to receiver 352. Control circuitry 360 may receive the time stamp of when the system fires a laser pulse from repetition rate/time interval adjustment circuitry 320 and operative to apply analytics and noise rejection to the data obtained by receiver 352 to provide filtered results. The filtered results may be provided to imaging system 380. Imaging system 380 may construct a 2D or 3D image of the environment being scanned by LiDAR system 300. During this process, reference beam information can be applied to the system to determine precise time stamps for receiving pulses and transmitting pulses as well.

Figure 3B:
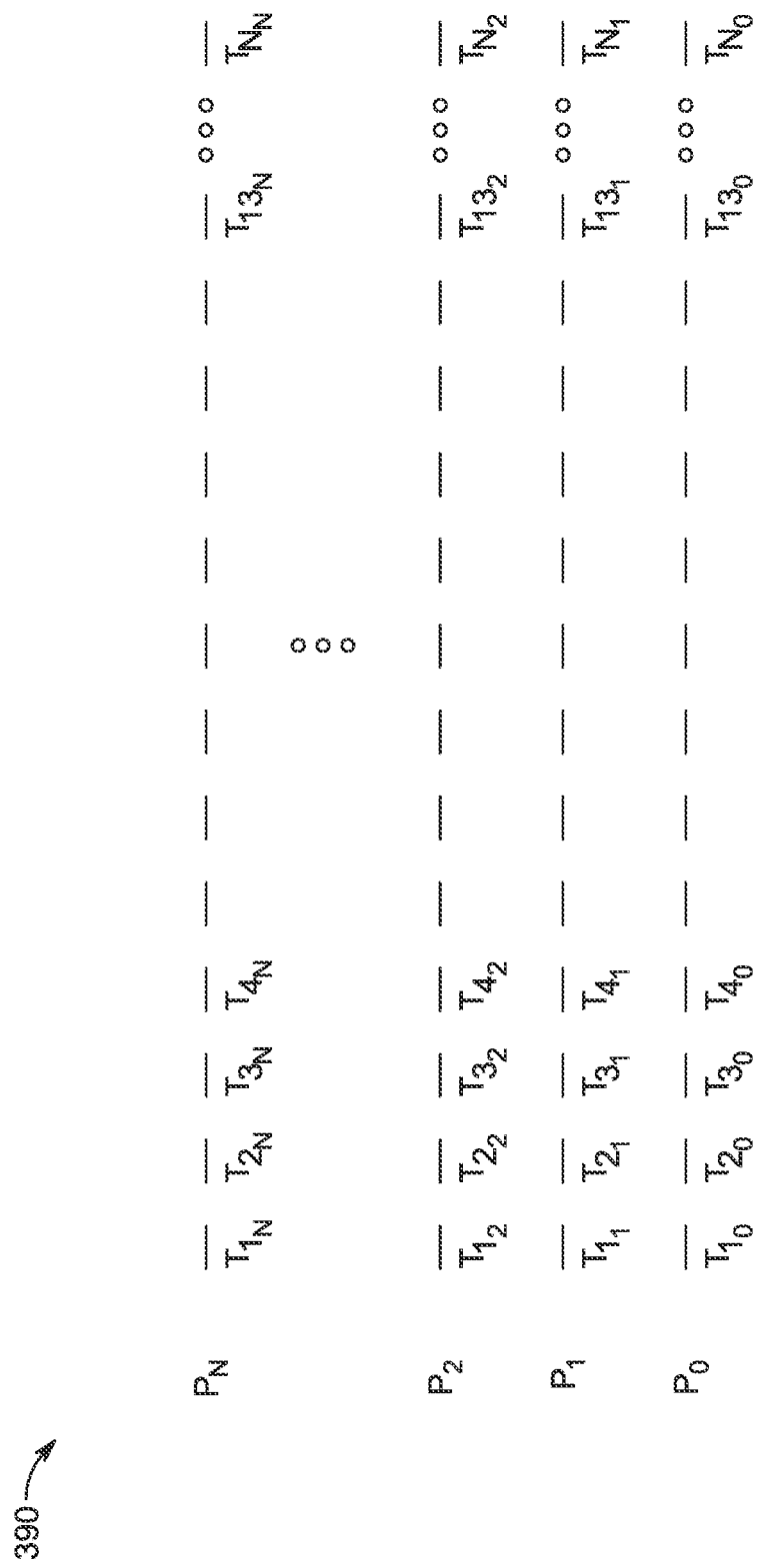
FIG. 3B shows an illustrative laser pulse pattern, according to an embodiment.

FIG. 3B shows an illustrative laser pulse pattern that may be provided by LiDAR system 300, according to an embodiment. LiDAR system 300 may project an array of laser pulses 390 that enables system 300 to observe a space (e.g., a two or three dimensional space). This array of laser pulses is projected every image capture cycle. Objects within the space can return laser pulses back to the system 300, which receives the return pulses and uses the data points to construct an image of objects within the space. The methods and algorithms for transmitting the laser pulses and how the data is interpreted is the subject of many embodiments discussed herein. LiDAR system 300 may be designed to observe a lateral field of view for each angle along a vertical field of view. The angles of the vertical field of view are shown as P0, P1, P2, through PN, and the lateral fields of view are shown as the sequence of dashed lines corresponding to each angle of the vertical field of view. At angle P0, for example, a laser pulse is transmitted at each dashed line, shown specifically at times $T1_0$, $T2_0$, $T3_0$, $T4_0$ through $TN_0$. The 0 subscript corresponds to the P0 angle. Similarly, at angle P1, a laser pulse is transmitted at times $T1_1$, $T2_1$, $T3_1$, $T4_1$ through $TN_1$. The 1 subscript corresponds to the P1 angle. Laser pulses are transmitted at each of the times as shown for all angles. The image capture cycle may include one sweep of all transmitted laser pulses for all angles. For example, the image capture cycle may start at time $T1_0$ and end at time $TN_N$.

The time interval between each laser pulse is varied in both the time and space. Time variations refer to variations in the time interval between laser pulses between each pulse across the lateral field of view is different. That is, the time interval between time $T1_0$ and $T2_0$ is different than the time interval between $T2_0$ and $T3_0$, and the time interval between $T2_0$ and $T3_0$ is different than the time interval between $T3_0$ and $T4_0$, and so on. Space variations refer to variations in the time interval of laser pulses between adjacent angles. That is, the time interval between time $T1_0$ and $T2_0$ is different than the time interval between $T1_1$ and $T2_1$, and the time interval between $T2_0$ and $T3_0$ is different than the time interval between $T2_1$ and $T3_1$, and so on. Moreover, the time interval between time $T1_1$ and $T2_1$ is different than the time interval between $T1_2$ and $T2_2$. Control circuitry 330 is aware of the time interval of each laser pulse and can ensure that the time interval varies across and time and space.

Figure 4:
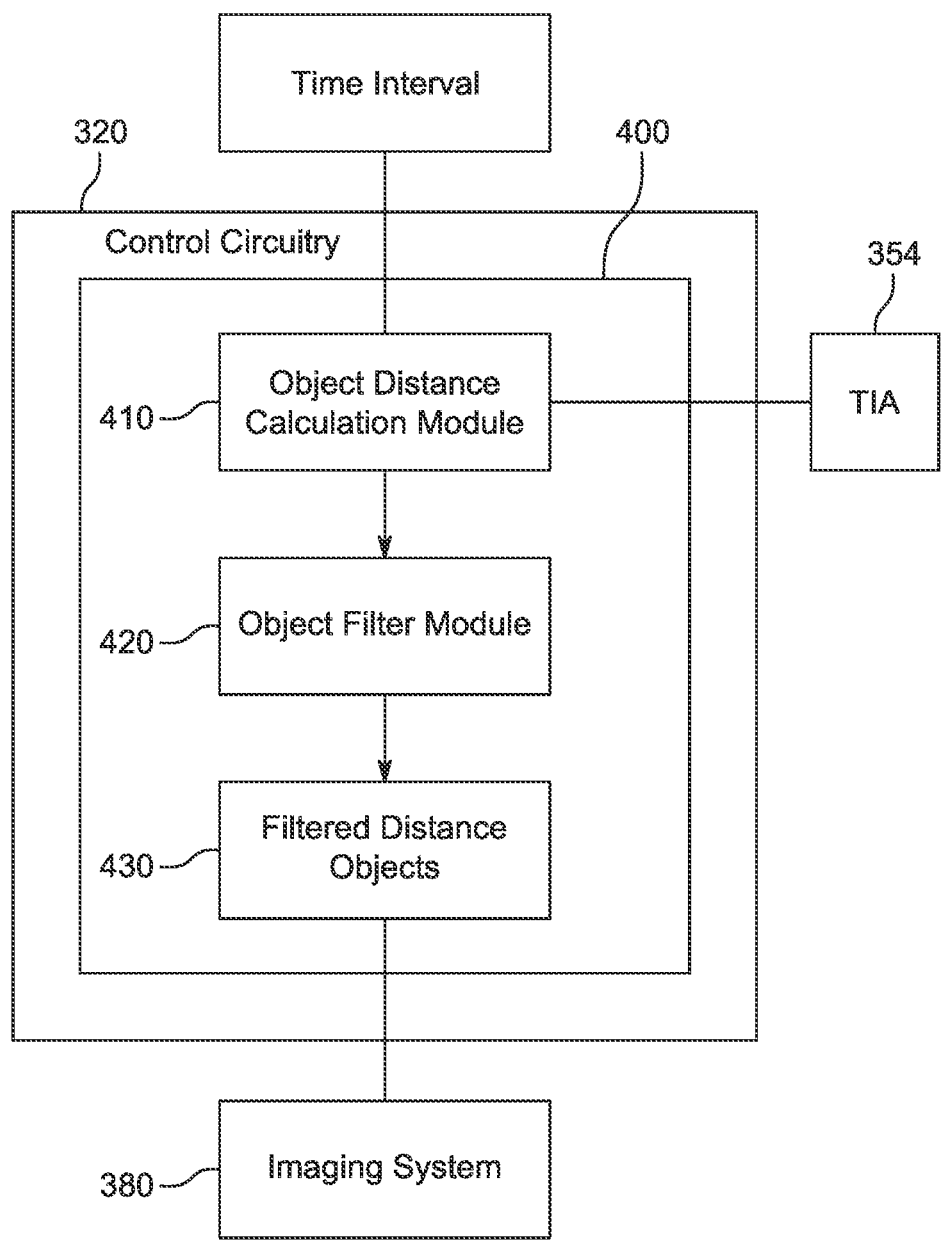
FIG. 4 shows illustrative block diagram of a portion of the LiDAR system of FIG. 3, according to an embodiment.

FIG. 4 shows an illustrative object rejection module 400 that may be executed by control circuitry 360 to confirm the distance accuracy of objects detected by receiver 352. Module 400 may be a software program that is executed by control circuitry 360 to verify the existence of objects at particular distances when LiDAR system 300 is operating at much high repetition rates than those of conventional LiDAR systems. Object rejection module 400 can include object distance calculation module 410, object filter module 420, and filtered distance objects 430. Object rejection module 400 is able to accurately determine the distance of an object by taking into account the varying time intervals and by applying one or more filters to reject distance calculations that do not meet the appropriate criteria.

Object distance calculation module 410 may receive the time interval from circuitry 320 and outputs from receiver 352, and based on those inputs, it can calculate several different distances, each corresponding to different transmission time stamps. That is, module 410 can calculate the distance of the detected object with respect to the current transmission time stamp, the distance of the detected object with respect to the previous transmission time stamp, and if desired, the distance of the detected object with respect to any number of transmission time stamps immediately preceding the previous transmission time stamp. The transmission time stamp coincides with when laser 340 is instructed to emit a laser pulse. Since laser 340 emits a laser pulse based on a variable time interval, module 410 may maintain a moving window of distance calculations (with respect to multiple transmission time stamps) for at least two successive receiver signals. To further illustrate this concept, please refer now to FIGS. 5 and 6.

Figure 5:
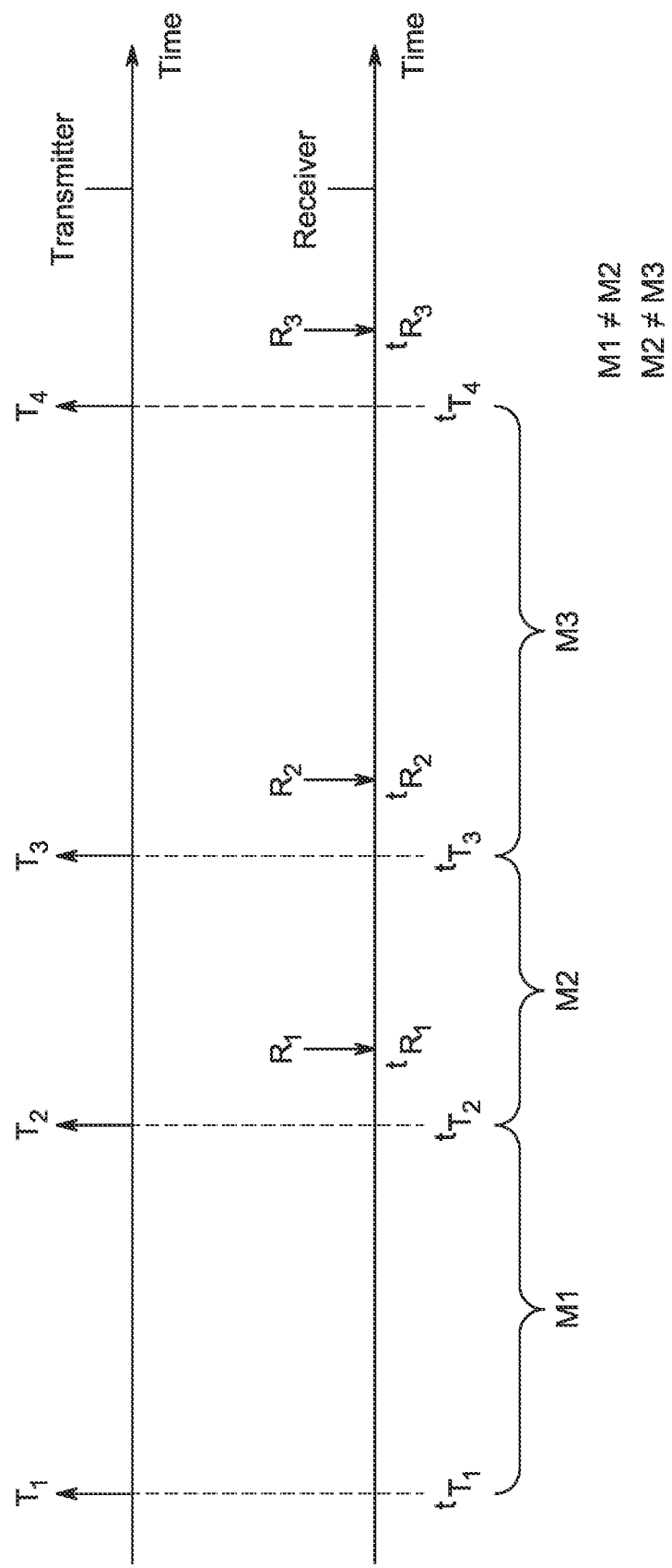
FIG. 5 shows an illustrative timing diagram showing transmission pulses and corresponding time stamps and receiver pulses and corresponding time stamps, according to an embodiment.

FIG. 5 shows an illustrative timing diagram showing transmission pulses and corresponding time stamps and receiver pulses and corresponding time stamps. The transmission pulses are shown as $T_1$, $T_2$, $T_3$, and $T_4$, and the receiver pulses are shown as $R_1$, $R_2$, and $R_3$. The timestamps for the transmission pulses are shown as $t_{T1}$ ... $t_{T4}$ and the timestamps for receiver pulses are shown as $t_{R1}$ ... $t_{R4}$. The time intervals in between each transmission pulse are shown as M1, M2, and M3, where M1≠M2 and M2≠M3 and are representative of the varying repetition rate for each successive transmission pulse. The transmission pulses may correspond to transmission pulses corresponding to a particular angle (e.g., one of angles P0, P1, P2, through PN of FIG. 3B).

FIG. 6 shows object distances (OD) calculated for R1 and for $R_2$. Because the system does not know whether R1 corresponds to T2 or to T1, object distance calculation module 410 can calculate two different distances: one with respect to T2 (shown as $OD1_{(R1)}$) and the other with respect to T1 (shown as $OD2_{(R1)}$). As an example, assuming that $t_{R1}$ is 1.2 μs and M1 is 1 μs, $OD1_{(R1)}$ is 30 meters and $OD2_{(R1)}$ is 180 meters. Because the system does not know whether R2 corresponds to T3 or to T2, object distance calculation module 410 can calculate two different distances: one with respect to T3 (shown as $OD1_{(R2)}$) and the other with respect to T2 (shown as $OD2_{(R2)}$). Following the example above, and assuming that $t_{R2}$ is 2.2 μs and M2 is 1.2 μs, $OD1_{(R2)}$ is 13.5 meters and $OD2_{(R2)}$ is 180 meters.

Referring now back to FIG. 4, after the object distances calculation are complete, object filter module 420 can apply filter criteria to determine whether to reject one or both of distance objects OD1 and OD2. The filter criteria is based on the fact that the object is continuous in the space, and the angle between the line connecting the consecutive scanning points landing on the object surface and the laser beam is greater than a threshold. The latter criteria are valid because if this angle is too small, the scattered light (return light) will be very weak due to large incidence angle. If LiDAR system observed a positive return from an object at a given angle, at least one of its neighbor angles should give a positive return as well. For example, referring briefly to FIG. 3B, if an object is detected at $T2_1$ and not detected at $T1_1$, $T3_1$ or $T2_0$, that same object should be detected at $T2_2$. In addition, the distance measured for these two neighbor positive returns should be less than a certain distance (e.g. 5 meters), assuming that no object can move faster than a certain speed (e.g. 5 km/s) and the neighboring points are measured at a very short time interval (e.g. 1 us for scanning in the lateral direction, or 1 ms for scanning in the vertical direction). If only one positive return is obtained and none of its neighbor angles generates returns, the system considers it as a noise or false return. For example, referring again briefly to FIG. 3B, if a return is seen at $T2_1$, but nothing within a reasonable distance (e.g. 5 meters) is seen at $T1_1$, $T3_1$, $T2_0$, or $T2_2$, the system may reject the return at $T3_1$ as noise or a false return.

Referring now to FIG. 7A, object filter module 420 can apply a time-based filter by comparing object distances within the same angle. In particular, object filter module 420 can determine whether the absolute value of the difference between $OD1_{(R2)}$ and $OD1_{(R1)}$ is less than a threshold (e.g. 5 meters). If that determination is true, the distance associated with OD1 is considered positive and is passed as a filtered distance object 430. If that determination is false, the distance associated with OD1 is negative and that distance is stored in memory. The negative OD1 is labeled as NOD1 and stored in memory for subsequent higher level analysis. Object filter module 420 also determines whether the absolute value of the difference between $OD2_{(R2)}$ and $OD2_{(R1)}$ is less than the same threshold. If that determination is true, the distance associated with OD2 is considered positive and is passed as a filtered distance object 430. If that determination is false, the distance associated with OD2 is negative and that distance is stored in the memory (and will be referred to below as NOD2). NOD1 and NOD2 can be used in a secondary verification to verify whether the returns seen at NOD1 and NOD2 are valid. For example, NOD1 and NOD2 can be applied to a space-based filter, described below to verify whether the returns seen at NOD1 and NOD2 are valid. The space-based filter can compare NOD1 and NOD2 to corresponding object distances at different vertical angles to determine whether any corroborating returns exist at adjacent vertical angles. If no corroborating returns exist for NOD1 and NOD2 at adjacent angles, then NOD1 and NOD2 can be rejected. If corroborating returns exist for NOD1 and NOD2 at adjacent angles, then NOD1 and NOD2 may be retained in memory for further analysis. The vertical angles refer to angles within the vertical field of view of a LiDAR system.

As a continuation of the above example, if the threshold is 5 meters, then the OD1 filter would fail because 30-13.5 is 16.5, which is greater than 5, but the OD2 filter would pass because 180-180 is 0, which is less than 5. In reality, this number may be a small non-zero number, such as, for example, one to five centimeters depending on the measurement uncertainty and movement of the object and LiDAR. Based on this filter, OD1 would be rejected, and stored in the memory, and OD2 distance of 180 meters would be passed as a filtered positive distance object 430.

Thus, it is shown that by varying the time intervals, the distance of far objects can be precisely calculated and mapped. This is because even though the far objects may cause ambiguities (e.g., ghosts) in determining which return signal belongs to which transmitter pulse, the variance of the repetition rate/time interval produces distance calculations that enable the erroneous distances objects to be rejected. The time interval variation between the neighboring transmitter pulses should be sufficiently different to guarantee the filter criteria can be applied to the system. For example, assume that a first time interval for a first transmitter pulse is M, then the immediately successive time interval for a successive transmitter pulse is (1±α)M, where α is a randomization factor that is applied to M. The randomization factor α should be larger than a certain value, e.g. 0.02 for the filter criteria of 5 meters and a time interval of 1 μs. The randomization factor and time intervals should also be bounded to a maximum and minimum value to guarantee high resolutions. Thus, the difference in adjacent time intervals is sufficiently different to ensure that "ghost" objects are filtered out by the time-based filter.

In some embodiments, the time intervals can repeat as a sequence of predetermined time intervals. For example, the sequence can include a fixed number of time intervals, each of which has a different length that satisfies a minimum delta requirement among adjacent time intervals to account for various tolerances in the system. The sequence can be repeated as necessary to trigger transmission pulses in accordance with the variable time intervals as discussed herein.

Referring now to FIG. 7B, object filter module 420 can apply a space-based filter by comparing object distances between adjacent angles. For example, assume that the space-time filter produced NOD2 according to a first angle (e.g., angle P0) and NOD2 according to an adjacent angle (e.g., angle P1). Object filter module 420 can determine whether the absolute value of the difference between $NOD2_{(P0)}$ and $NOD2_{(P1)}$ is less than a vertical distance threshold. If that determination is true, the distance associated with NOD2 is considered accurate and is passed as a filtered distance object 430. If that determination is false, the distance associated with NOD2 is negative and that distance is restored in the memory for higher level judgement.

In some embodiments, varying time interval can be used to detect objects that are really far away. This can be accomplished by calculating and filtering object distances with respect to at least three successive transmission pulses. For example, referring to FIG. 5, assume that R2 is actually a return corresponding to the T1 transmission pulse and that R3 corresponds to the T2 transmission pulse, and R1 does not exist. The system can determine whether R2 corresponds to T3, T2, or T1 using embodiments discussed herein. In this example, object distance calculation module 410 can calculate multiple object distances with respect to R3 and R2 to determine the correct distance of R2. For example, module 410 can calculate the following object distance for R3: one with respect to T4 ($OD1_{(R3)}$), one with respect to T3

($OD2_{(R3)}$), and one with respect to T2 ($OD3_{(R3)}$). Module 410 can calculate the following object distance for R2: one with respect to T3 ($OD1_{(R2)}$), one with respect to T2 ($OD2_{(R2)}$), and one with respect to T1 ($OD33_{(R2)}$). All of the object distances can be evaluated by one or more filters to determine which object distances should be accepted or rejected. For example, the OD1 filter can calculate the difference between ($OD1_{(R3)}$) and ($OD1_{(R2)}$) and compare it to a threshold, the OD2 filter can calculate the difference between ($OD2_{(R3)}$) and ($OD2_{(R2)}$) and compare it to the threshold, and the OD3 filter can calculate the difference between ($OD3_{(R3)}$) and ($OD3_{(R2)}$) and compare it to the threshold. In this particular example, the difference between ($OD3_{(R3)}$) and ($OD3_{(R2)}$) is approximately zero, thus indicating that the correct distance associated with R2 is correlated to transmission T1.

Thus, it should be appreciated that the variable time interval embodiments can be used to correctly determine the location of objects at any reasonable distance, including, for example, distances of 500 meters or more. Depending on the desired range of distance calculations, the system can calculate the requisite number of distance calculations needed to make the determination. The example above showed the system calculating distance calculations with respect to three successive transmission pulses (and FIG. 6 and FIG. 7A examples showed distance calculations with respect to two successive transmission pulses). If desired, the system can calculate distances with respect to any number of successive transmission pulses, using the number necessary to cover the desired range of object detection.

Figure 8:
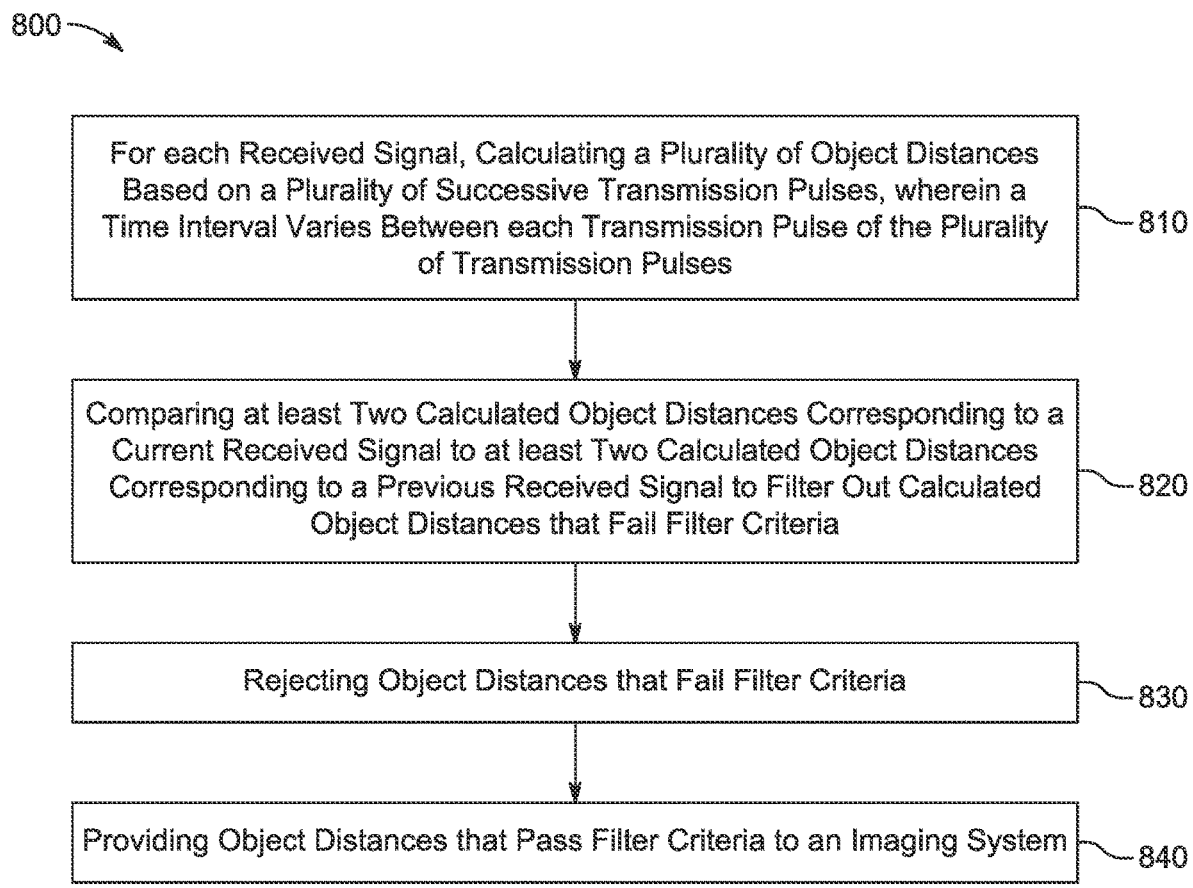
FIG. 8 shows an illustrative process that uses a varying repetition rate to produce filtered distance objects in accordance with various embodiments.

FIG. 8 shows an illustrative process 800 that uses a varying repetition rate/time interval to produce filtered distance objects in accordance with various embodiments. At step 810, for each received signal, several object distances are calculated based on a plurality of successive transmission pulses, wherein a time interval varies between each transmission pulse of the plurality of transmission pulses. At step 820, at least two calculated object distances corresponding to a current received signal are compared to at least two calculated object distances corresponding to a previous received signal to filter out calculated object distances that fail filter criteria. At step 830, object distances that fail filter criteria are stored in memory for higher level analysis. At step 840, object distances that pass filter criteria are passed to an imaging system.

It should be understood that the steps in FIG. 8 are merely illustrative and that additional steps may be added and the order to the steps may be rearranged.

The variable time interval can be used to reject not only ghost objects, but to reject objects that exceed a fixed distance. For example, certain applications may not want to process objects that exist at a distance exceeding a fixed threshold (e.g., 150 meters). The variable time interval filtering algorithm can be used to verify that an object exists at a distance beyond the fixed threshold, and reject any ghost objects may stem from that object, but a system using the data obtained from the filtering algorithm may reject objects verified to exist beyond the fixed threshold.

The high frequency, variable time interval filtering algorithm discussed herein is also able to take the following scenario into account. Assume there is transparent object/small object in the range of c/2*M. The transparent object reflects certain partial of signal back to the receiver, but the remainder of the transmission pulse keeps propagating and hits a far object, which is out of the range of c/2*M. In addition, the distance between the near object and far object is exactly equal to c/2*M, which means the two objects overlapped.

In some embodiments, the LiDAR system is able to discriminate among observed objects that are relatively close and observed objects that are relatively far by varying a time interval between successive laser pulses being emitted by the LiDAR system. Thus, by varying the time interval and using that as part of the basis for determining object distance calculations, the LiDAR system and methods for the use thereof can differentiate among return pulses and accurately classify whether the return pulse corresponds to a close object, a far object, a ghost object, or is derived from another laser source. If desired, the results of the discrimination can be used as data points for generating an image representing a field of view of the LiDAR system.

In some embodiments, LiDAR system can transmit laser pulses in succession, such that a time interval between successively transmitted laser pulses is varied. The LiDAR system can detect return pulses that are consequences of the transmitted laser pulses. The LiDAR system can use the varied time interval of successively transmitted laser pulses to discriminate among distance calculations of an object corresponding to the return pulses. This enables the LiDAR system to verify which one of a relatively far distance calculation corresponding to an object and a relatively close distance calculation corresponding to the same object is incorrect. This also enables the LiDAR system to reject distance calculations corresponding to a ghost object and to reject return pulses that are the consequence of laser pulses originating from another laser transmission source.

In some embodiments, the LiDAR system can transmit successive transmission pulses in accordance with a variable time interval, wherein the variable time interval changes for each transmission pulse, receive return pulses corresponding to an object, and determine distance calculations corresponding to the object based, at least in part, on the return pulses. The LiDAR system can discriminate among the distance calculations by evaluating the plurality of return pulses in connection with the variable time interval of the successive transmission pulses. If desired, the discriminated distances can be sued as data points to generate an image representing a field of view of the LiDAR system.

Figure 9:
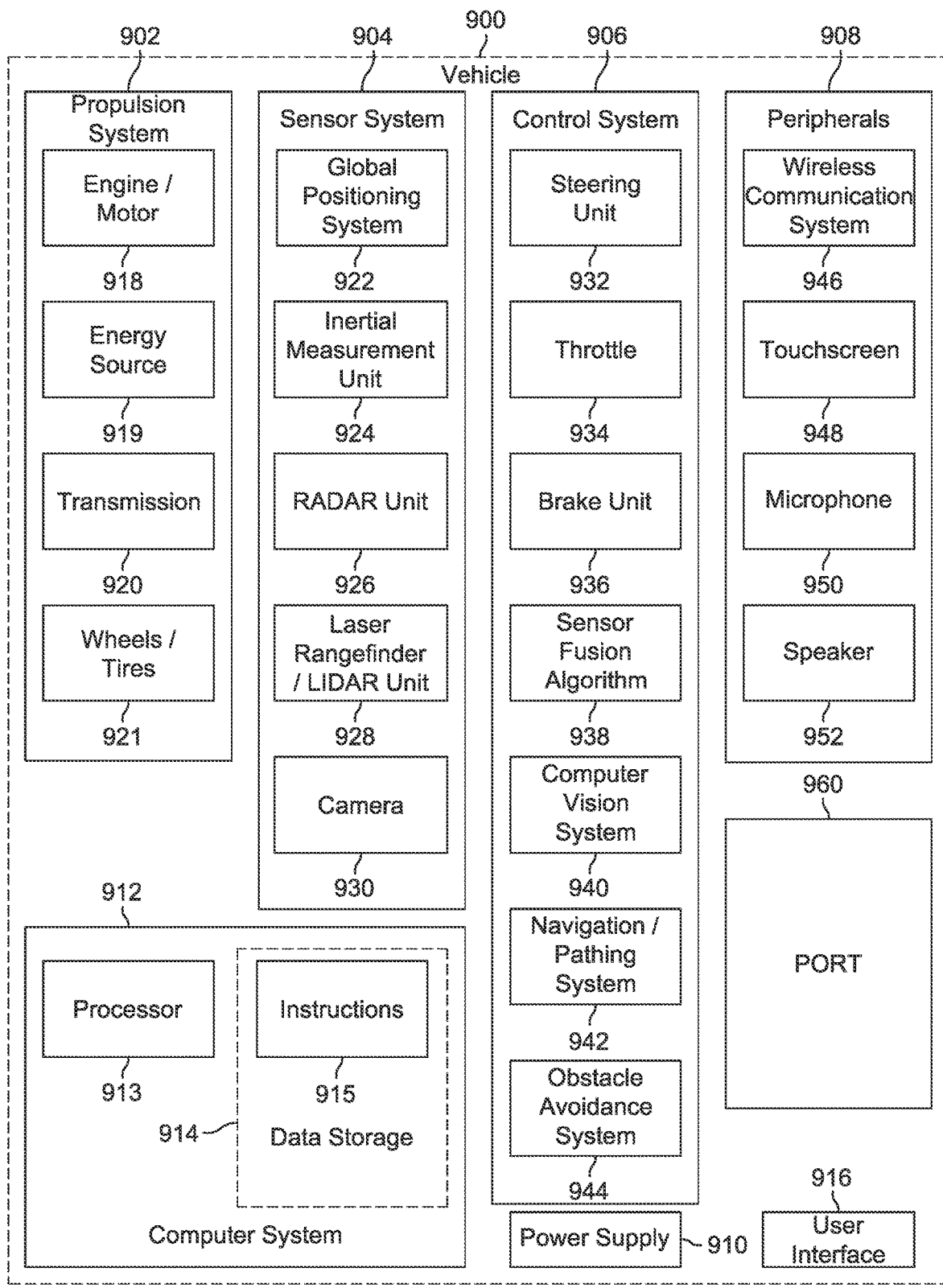
FIG. 9 is a functional block diagram illustrating a vehicle system, according to an embodiment.

FIG. 9 is a functional block diagram illustrating a vehicle system 900, according to an example embodiment. Vehicle 900 can be configured to operate fully or partially in an autonomous mode. For example, vehicle 900 can control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control vehicle 900 based on the determined information. While in autonomous mode, the vehicle 900 may be configured to operate without human interaction.

In some embodiments, vehicle 900 can operate under solely control of a human operator, but the various sensors and systems of the vehicle and the road conditions (e.g., road and the path traveled, other vehicles, stop signs, traffic lights, various events occurring outside of the vehicle) can be monitored and recorded.

Vehicle 900 can include various subsystems such as a propulsion system 902, a sensor system 904, a control system 906, one or more peripherals 908, as well as a power supply 910, a computer system 912, and a user interface 916. Vehicle 900 may include more or fewer subsystems and each subsystem can include multiple elements. Further, each of the subsystems and elements of vehicle 900 can be interconnected. Thus, one or more of the described functions of the vehicle 900 may be divided up into additional functional or physical components, or combined into fewer functional or physical components. In some further examples, additional functional and/or physical components may be added to the examples illustrated by FIG. 9.

Propulsion system 902 may include components operable to provide powered motion for the vehicle 900. Depending upon the embodiment, the propulsion system 902 can include an engine/motor 918, an energy source 919, a transmission 920, and wheels/tires 921. The engine/motor 918 can be any combination of an internal combustion engine, an electric motor, steam engine, Stirling engine, or other types of engines and/or motors. In some embodiments, the engine/motor 918 may be configured to convert energy source 919 into mechanical energy. In some embodiments, the propulsion system 902 can include multiple types of engines and/or motors. For instance, a gas-electric hybrid car can include a gasoline engine and an electric motor. Other examples are possible.

Energy source 919 can represent a source of energy that may, in full or in part, power the engine/motor 918. That is, the engine/motor 918 can be configured to convert the energy source 919 into mechanical energy. Examples of energy sources 919 include gasoline, diesel, other petroleum-based fuels, propane, other compressed gas-based fuels, ethanol, solar panels, batteries, and other sources of electrical power. The energy source(s) 919 can additionally or alternatively include any combination of fuel tanks, batteries, capacitors, and/or flywheels. The energy source 919 can also provide energy for other systems of the vehicle 900.

Transmission 920 can include elements that are operable to transmit mechanical power from the engine/motor 918 to the wheels/tires 921. To this end, the transmission 920 can include a gearbox, clutch, differential, and drive shafts. The transmission 920 can include other elements. The drive shafts can include one or more axles that can be coupled to the one or more wheels/tires 921.

Wheels/tires 921 of vehicle 900 can be configured in various formats, including a unicycle, bicycle/motorcycle, tricycle, or car/truck four-wheel format. Other wheel/tire geometries are possible, such as those including six or more wheels. Any combination of the wheels/tires 921 of vehicle 900 may be operable to rotate differentially with respect to other wheels/tires 921. The wheels/tires 921 can represent at least one wheel that is fixedly attached to the transmission 920 and at least one tire coupled to a rim of the wheel that can make contact with the driving surface. The wheels/tires 921 can include any combination of metal and rubber, or another combination of materials.

Sensor system 904 may include a number of sensors configured to sense information about an environment of the vehicle 900. For example, the sensor system 904 can include a Global Positioning System (GPS) 922, an inertial measurement unit (IMU) 924, a RADAR unit 926, a laser rangefinder/LIDAR unit 928, and a camera 930. The sensor system 904 can also include sensors configured to monitor internal systems of the vehicle 900 (e.g., 02 monitor, fuel gauge, engine oil temperature). Other sensors are possible as well.

One or more of the sensors included in sensor system 904 can be configured to be actuated separately and/or collectively in order to modify a position and/or an orientation of the one or more sensors.

GPS 922 may be any sensor configured to estimate a geographic location of the vehicle 900. To this end, GPS 922 can include a transceiver operable to provide information regarding the position of the vehicle 900 with respect to the Earth.

IMU 924 can include any combination of sensors (e.g., accelerometers and gyroscopes) configured to sense position and orientation changes of the vehicle 900 based on inertial acceleration.

RADAR unit 926 may represent a system that utilizes radio signals to sense objects within the local environment of the vehicle 900. In some embodiments, in addition to sensing the objects, the RADAR unit 926 may additionally be configured to sense the speed and/or heading of the objects. Similarly, laser rangefinder or LIDAR unit 928 may be any sensor configured to sense objects in the environment in which the vehicle 900 is located using lasers. Depending upon the embodiment, the laser rangefinder/LIDAR unit 928 can include one or more laser sources, a laser scanner, and one or more detectors, among other system components. The laser rangefinder/LIDAR unit 928 can be configured to operate in a coherent (e.g., using heterodyne detection) or an incoherent detection mode.

Camera 930 can include one or more devices configured to capture a plurality of images of the environment of vehicle 900. Camera 930 can be a still camera or a video camera.

Control system 906 may be configured to control operation of vehicle 900 and its components. Accordingly, control system 906 can include various elements include steering unit 932, throttle 934, brake unit 936, a sensor fusion algorithm 938, a computer vision system 940, a navigation/pathing system 942, and an obstacle avoidance system 944.

Steering unit 932 can represent any combination of mechanisms that may be operable to adjust the heading of vehicle 900. Throttle 934 can be configured to control, for instance, the operating speed of the engine/motor 918 and, in turn, control the speed of the vehicle 900. Brake unit 936 can include any combination of mechanisms configured to decelerate the vehicle 900. Brake unit 936 can use friction to slow wheels/tires 921. In other embodiments, the brake unit 936 can convert the kinetic energy of wheels/tires 921 to electric current. The brake unit 936 may take other forms as well. The brake unit 936 may control braking of the vehicle 900, for example, using a braking algorithm that takes into account input from one or more units of the sensor system 904.

Sensor fusion algorithm 938 may be an algorithm (or a computer program product storing an algorithm) configured to accept data from the sensor system 904 as an input. The data may include, for example, data representing information sensed at the sensors of the sensor system 904. The sensor fusion algorithm 938 can include, for instance, a Kalman filter, Bayesian network, or other algorithm. The sensor fusion algorithm 938 can further provide various assessments based on the data from sensor system 904. Depending upon the embodiment, the assessments can include evaluations of individual objects and/or features in the environment of vehicle 900, evaluation of a particular situation, and/or evaluate possible impacts based on the particular situation. Other assessments are possible.

Computer vision system 940 may be any system operable to process and analyze images captured by camera 930 in order to identify objects and/or features in the environment of vehicle 900 that can include traffic signals, road way boundaries, and obstacles. Computer vision system 940 can use an object recognition algorithm, a Structure From Motion (SFM) algorithm, video tracking, and other computer vision techniques. In some embodiments, the computer vision system 940 can be additionally configured to map an environment, track objects, estimate the speed of objects, etc.

Navigation and pathing system 942 may be any system configured to determine a driving path for the vehicle 900, for example, by referencing navigation data such as geographical or map data. The navigation and pathing system 942 may additionally be configured to update the driving path dynamically while the vehicle 900 is in operation. In some embodiments, the navigation and pathing system 942 can be configured to incorporate data from the sensor fusion algorithm 938, the GPS 922, and one or more predetermined maps so as to determine the driving path for vehicle 900. Obstacle avoidance system 944 can represent a control system configured to identify, evaluate, and avoid or otherwise negotiate potential obstacles in the environment of the vehicle 900. Control system 906 may additionally or alternatively include components other than those shown and described.

Peripherals 908 may be configured to allow interaction between the vehicle 900 and external sensors, other vehicles, other computer systems, and/or a user. For example, peripherals 908 can include a wireless communication system 946, a touchscreen 948, a microphone 950, and/or a speaker 952. In an example embodiment, peripherals 908 can provide, for instance, means for a user of the vehicle 900 to interact with the user interface 916. To this end, touchscreen 948 can provide information to a user of vehicle 900. User interface 916 can also be operable to accept input from the user via the touchscreen 948. The touchscreen 948 may be configured to sense at least one of a position and a movement of a user's finger via capacitive sensing, resistance sensing, or a surface acoustic wave process, among other possibilities. Touchscreen 948 may be capable of sensing finger movement in a direction parallel or planar to the touchscreen surface, in a direction normal to the touchscreen surface, or both, and may also be capable of sensing a level of pressure applied to the touchscreen surface. Touchscreen 948 may be formed of one or more translucent or transparent insulating layers and one or more translucent or transparent conducting layers. Touchscreen 948 may take other forms as well.

In other instances, peripherals 908 may provide means for the vehicle 900 to communicate with devices within its environment. Microphone 950 may be configured to receive audio (e.g., a voice command or other audio input) from a user of vehicle 900. Similarly, speakers 952 may be configured to output audio to the user of vehicle 900.

In one example, wireless communication system 946 can be configured to wirelessly communicate with one or more devices directly or via a communication network. For example, wireless communication system 946 can use 3G cellular communication, such as CDMA, EVDO, GSM/GPRS, or 4G cellular communication, such as WiMAX or LTE. Alternatively, wireless communication system 946 can communicate with a wireless local area network (WLAN), for example, using WiFi. In some embodiments, wireless communication system 946 can communicate directly with a device, for example, using an infrared link, Bluetooth, or ZigBee. Other wireless protocols, such as various vehicular communication systems, are possible within the context of the disclosure. For example, the wireless communication system 946 can include one or more dedicated short range communications (DSRC) devices that can include public and/or private data communications between vehicles and/or roadside stations.

Power supply 910 may provide power to various components of vehicle 900 and can represent, for example, a rechargeable lithium-ion or lead-acid battery. In some embodiments, one or more banks of such batteries can be configured to provide electrical power. Other power supply materials and configurations are possible. In some embodiments, the power supply 910 and energy source 919 can be implemented together, as in some all-electric cars.

Many or all of the functions of vehicle 900 can be controlled by computer system 912. Computer system 912 may include at least one processor 913 (which can include at least one microprocessor) that executes instructions 915 stored in a non-transitory computer readable medium, such as the data storage 914. Computer system 912 may also represent a plurality of computing devices that may serve to control individual components or subsystems of the vehicle 900 in a distributed fashion.

In some embodiments, data storage 914 may contain instructions 915 (e.g., program logic) executable by processor 913 to execute various functions of vehicle 900, including those described above in connection with FIG. 9. In some embodiments, processor 913 may be operative to run an artificial intelligence (AI) engine, for example, to control the various systems of the vehicle 900. Data storage 914 may contain additional instructions as well, including instructions to transmit data to, receive data from, interact with, and/or control one or more of propulsion system 902, sensor system 904, control system 906, and peripherals 908. In addition to instructions 915, data storage 914 may store data such as roadway maps, path information, among other information. Such information may be used by vehicle 900 and computer system 912 at during the operation of vehicle 900 in the autonomous, semi-autonomous, and/or manual modes.

Vehicle 900 may include a user interface 916 for providing information to or receiving input from a user of vehicle 900. User interface 916 can control or enable control of content and/or the layout of interactive images that can be displayed on the touchscreen 948. Further, user interface 916 can include one or more input/output devices within the set of peripherals 908, such as wireless communication system 946, touchscreen 948, microphone 950, and the speaker 952.

Port 960 may be a port through which vehicle 900 receives power to charge power supply 910 and to communicate data stored in data store 914.

Computer system 912 may control the function of vehicle 900 based on inputs received from various subsystems (e.g., propulsion system 902, sensor system 104, and control system 906), as well as from user interface 916. For example, computer system 912 may utilize input from control system 906 in order to control steering unit 932 to avoid an obstacle detected by sensor system 904 and obstacle avoidance system 944. Depending upon the embodiment, computer system 912 can be operable to provide control over many aspects of vehicle 900 and its subsystems.

The components of vehicle 900 can be configured to work in an interconnected fashion with other components within or outside their respective systems. For instance, in an example embodiment, camera 930 can capture a plurality of images that can represent information about a state of an environment of vehicle 900 operating in an autonomous or manual mode. The environment can include every conceivable type of data that can be observed and collected by vehicle 900. For example, the environment can include the road and all aspects associated with the road such as temperature, composition of the road (e.g., concrete or asphalt), moisture level, lanes, curbs, turn lanes, cross walks, stop lights, stop signs, yield signs and other traffic signs, and barricades. The environment can include objects such as other vehicles, people, random debris in or adjacent to the road.

Computer system 912 can monitor and log the environmental inputs in conjunction with operational states of the vehicle. The operational states can refer to operational and control parameters of the vehicle such as speed, trajectory, steering input, acceleration input, and brake input, and also can include results of driver input or AI driver input. This way, regardless of whether the vehicle is operating in autonomous mode or under human control, computer system 912 can simultaneously log the environmental inputs and the operational states to provide a comprehensive vehicle log.

Although FIG. 9 shows various components of vehicle 900, i.e., wireless communication system 946, computer system 912, data storage 914, and user interface 916, as being integrated into vehicle 900, one or more of these components can be mounted or associated separately from the vehicle 900. For example, data storage 914 can, in part or in full, exist separate from vehicle 900. Thus, vehicle 900 can be provided in the form of device elements that may be located separately or together. The device elements that make up vehicle 900 can be communicatively coupled together in a wired and/or wireless fashion.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-9, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A method, comprising:
    emitting, by a transmission system of a light ranging and detection (LiDAR) system, a plurality of transmission pulses using a plurality of variable time intervals comprising a first time interval and a second time interval, wherein the first time interval and the second time interval are not equal;
    receiving, by a receiver, a plurality of return pulses;
    calculating, by a receiver control circuitry, a first plurality of object distances, wherein each of the first plurality of object distances corresponds to one of the plurality of return pulses and one of the plurality of transmission pulses associated with the plurality of variable time intervals;
    determining, by the receiver control circuitry, a second plurality of object distances of a plurality of neighboring return pulses, wherein at least one of the second plurality of object distances is calculated using one or more neighboring return pulses corresponding to a same transmission pulse for calculating at least one of the first plurality of object distances; and
    determining, by the receiver control circuitry, whether the second plurality of object distances of the plurality of neighboring return pluses fails to meet one or more filter criteria by determining a distance comparison value based on differences between the first plurality of object distances and the second plurality of object distances calculated based on combinations of the plurality of transmission pulses and the plurality of neighboring return pulses.

2. The method of claim 1, wherein one or more of the first plurality of object distances are calculated based on a most recently emitted transmission pulse or a second most recently emitted transmission pulse.

3. The method of claim 1, wherein the plurality of variable time intervals further comprises a third time interval that is not equal to the first time interval or the second time interval.

4. The method of claim 1, wherein each of the plurality of return pulses comprises light from one of the transmission pulses that is reflected from an object located at a distance from the LiDAR system.

5. The method of claim 1, wherein determining, by the receiver control circuitry, the second plurality of object distances of the plurality of neighboring return pulses comprises:
determining two or more object distances associated with neighboring return pulses, wherein the two or more object distances are calculated based on a most recently emitted transmission pulse or a second most recently emitted transmission pulse.

6. The method of claim 1, wherein each of the first plurality of object distance corresponds to one or more of (1) location information associated with a return pulse, the location information comprising a calculated distance to the LiDAR system, (2) the time interval associated with successive transmission pulses, and (3) filter information for the object distance.

7. The method of claim 1, further comprising:
determining an object distance OD of the first plurality of object distances corresponding to a return pulse of the plurality of return pulses, the return pulse being detected a time difference after emission of a corresponding most recently emitted transmission pulse,
wherein the time difference is less than the time interval between the most recently emitted transmission pulse and the second most recently emitted transmission pulse.

8. The method of claim 7, wherein the object distance OD is determined from an expression $OD = c \cdot \Delta T/2$, wherein c is a speed of light.

9. The method of claim 1, wherein determining whether the second plurality of object distances of the plurality of neighboring return pluses fails to meet one or more filter criteria comprises:
determining that the second plurality of object distances of the plurality of neighboring return pluses fails to meet the one or more filter criteria by determining that the distance comparison value is greater than a threshold value.

10. The method of claim 1, further comprising:
in response to determining that the second plurality of object distances of the plurality of neighboring return pluses fails to meet the one or more filter criteria, performing at least one of:
labeling the second plurality of object distances as negative; or
rejecting the second plurality of object distances.

11. A method, comprising:
emitting, by a light source of a light ranging and detection (LiDAR) system, a plurality of optical pulses using a plurality of varying repetition rates corresponding to a first time interval and a second time interval, wherein the first time interval and the second time interval are not equal;
detecting, by a receiver of the LiDAR system, a plurality of return optical pulses;
generating, by a processor of the LiDAR system, a plurality of data elements, wherein each of the plurality of data elements corresponds to one of the plurality of return optical pulses and wherein each of the plurality of data element corresponds to a repetition rate associated with a most recently emitted optical pulse of the plurality of optical pulses or a second most recently emitted optical pulse;
determining, by the processor, a group of neighboring data elements, wherein at least one of the group of neighboring data elements is calculated using one or more return optical pulses corresponding to a same emitted optical pulse for calculating at least one of the plurality of data elements; and
determining, by the processor, whether a data element of the group of neighboring data elements has a range ambiguity by determining a data element difference value based on differences between the plurality of data element and the group of neighboring data elements determined based on combinations of the plurality of emitted optical pulses and a group of neighboring return optical pulses.

12. The method of claim 11, wherein the plurality of varying repetition rates further corresponds to a third time interval that is not equal to the first time interval or the second time interval.

13. The method of claim 11, wherein each of the return optical pulses comprises light from one of the optical pulses that is scattered by a target located at a distance from the LiDAR system.

14. The method of claim 11, wherein determining, by the processor, the group of neighboring data elements comprises determining one or more data elements from the plurality of data elements that are located within a threshold distance from each other.

15. The method of claim 11, wherein each data element of the plurality of data elements comprises one or more of (1) location information associated with the data element, (2) the repetition rate associated with the most recently emitted optical pulse, and (3) range ambiguity information for the data element.

16. The method of claim 11, further comprising:
determining a distance D associated with a data element corresponding to a return optical pulse, the return optical pulse being detected a time difference $\Delta T$ after emission of a corresponding most recently optical pulse,
wherein the time difference $\Delta T$ is less than the time interval between the most recently emitted optical pulse and the second most recently emitted transmission pulse.

17. The method of claim 16, wherein the distance D associated with the data element is determined from an expression $D = c \cdot \Delta T/2$, wherein c is a speed of light.

18. The method of claim 11, wherein the processor is configured to determine that a data element of the group of neighboring data elements has a range ambiguity comprises determining when the data element difference value is greater than a particular threshold value.

19. The method of claim 11, further comprising:
in response to determining that a data element of the group of neighboring data elements has a range ambiguity, performing one of:
tagging the data element with a value that corresponds to the likelihood or probability that the data element has range ambiguity; or
discarding or ignoring the data element.

20. A light detection and ranging (LiDAR) system, comprising:
a transmission system configured to emit a plurality of transmission pulses using a plurality of variable time intervals comprising a first time interval and a second time interval, wherein the first time interval and the second time interval are not equal;

a receiver configured to receive a plurality of return pulses; and a receiver control circuitry configured to:
calculate a first plurality of object distances, wherein each of the first plurality of object distances corresponds to one of the plurality of return pulses and one of the plurality of transmission pulses associated with the plurality of variable time intervals;

determine a second plurality of object distances of a plurality of neighboring return pulses, wherein at least one of the second plurality of object distances is calculated using one or more neighboring return pulses corresponding to a same transmission pulse for calculating at least one of the first plurality of object distances; and determine whether the second plurality of object distances of the plurality of neighboring return pluses fails to meet one or more filter criteria by determining a distance comparison value based on differences between the first plurality of object distances and the second plurality of object distances calculated based on combinations of the plurality of transmission pulses and the plurality of neighboring return pulses.

21. The system of claim 20, wherein one or more of the first plurality of object distances are calculated based on a most recently emitted transmission pulse or a second most recently emitted transmission pulse.

22. The system of claim 20, wherein the plurality of variable time intervals further comprises a third time interval that is not equal to the first time interval or the second time interval.

23. A light detection and ranging (LiDAR) system, comprising:
a light source configured to emit a plurality of optical pulses using a plurality of varying repetition rates corresponding to a first time interval and a second time interval, wherein the first time interval and the second time interval are not equal;

a receiver configured to detect a plurality of return optical pulses; and a processor configured to:
generate a plurality of data elements, wherein each of the plurality of data elements corresponds to one of the plurality of return optical pulses and wherein each of the plurality of data element corresponds to a repetition rate associated with a most recently emitted optical pulse of the plurality of optical pulses or a second most recently emitted optical pulse;

determine a group of neighboring data elements, wherein at least one of the group of neighboring data elements is calculated using one or more return optical pulses corresponding to a same emitted optical pulse for calculating at least one of the plurality of data elements; and determine whether a data element of the group of neighboring data elements has a range ambiguity by determining a data element difference value based on differences between the plurality of data element and the group of neighboring data elements determined based on combinations of the plurality of emitted optical pulses and a group of neighboring return optical pulses.

24. The system of claim 23, wherein the plurality of varying repetition rates further corresponds to a third time interval that is not equal to the first time interval or the second time interval.

25. The system of claim 23, wherein each of the return optical pulses comprises light from one of the optical pulses that is scattered by a target located at a distance from the LiDAR system.

26. The system of claim 23, wherein the processor is further configured to determine one or more data elements from the plurality of data elements that are located within a threshold distance from each other.

* * * * *